United States Patent
Hawes et al.

(10) Patent No.: US 12,012,572 B2
(45) Date of Patent: *Jun. 18, 2024

(54) AUTOMOTIVE PAINT REMOVER COMPOSITION AND METHOD OF MAKING

(71) Applicant: W.M. Barr & Company, Inc., Memphis, TN (US)

(72) Inventors: Charles L. Hawes, Cordova, TN (US); Tim Teague, Nesbit, MS (US)

(73) Assignee: W.M. Barr & Company, Inc., Memphis, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/154,032

(22) Filed: Oct. 8, 2018

(65) Prior Publication Data
US 2019/0106657 A1    Apr. 11, 2019

Related U.S. Application Data

(60) Provisional application No. 62/569,730, filed on Oct. 9, 2017.

(51) Int. Cl.
| | | |
|---|---|---|
| *C11D 3/20* | (2006.01) | |
| *C09D 9/00* | (2006.01) | |
| *C11D 1/00* | (2006.01) | |
| *C11D 3/12* | (2006.01) | |
| *C11D 3/18* | (2006.01) | |
| *C11D 3/22* | (2006.01) | |
| *C11D 3/30* | (2006.01) | |
| *C11D 3/40* | (2006.01) | |
| *C11D 3/43* | (2006.01) | |
| *C11D 1/66* | (2006.01) | |
| *C11D 3/24* | (2006.01) | |

(52) U.S. Cl.
CPC ............ *C11D 3/2096* (2013.01); *C09D 9/005* (2013.01); *C11D 1/00* (2013.01); *C11D 3/124* (2013.01); *C11D 3/18* (2013.01); *C11D 3/22* (2013.01); *C11D 3/225* (2013.01); *C11D 3/30* (2013.01); *C11D 3/40* (2013.01); *C11D 3/43* (2013.01); *C11D 1/66* (2013.01); *C11D 3/2072* (2013.01); *C11D 3/2093* (2013.01); *C11D 3/24* (2013.01)

(58) Field of Classification Search
CPC ....... C11D 1/00; C11D 3/2072; C11D 3/2093; C11D 3/2096; C11D 3/22; C11D 3/24; C11D 3/30
USPC ....... 510/201, 202, 203, 204, 205, 208, 211, 510/212, 406, 470, 499, 505, 506, 511
See application file for complete search history.

(56) References Cited

U.S. PATENT DOCUMENTS

| | | |
|---|---|---|
| 4,854,973 A | 8/1989 | Holdar |
| 5,308,527 A | 5/1994 | Allier et al. |
| 5,403,402 A | 4/1995 | LeGrow |
| 5,780,409 A | 7/1998 | Distaso |
| 6,159,915 A | 12/2000 | Machac, Jr. et al. |
| 6,200,940 B1 | 3/2001 | Vitomir |
| 6,395,103 B1 | 5/2002 | Machac, Jr. et al. |
| 6,673,157 B1 | 1/2004 | McKim et al. |
| 6,699,829 B2* | 3/2004 | Doyel .................. C11D 7/5018 510/202 |
| 6,833,345 B2 | 12/2004 | Machac, Jr. et al. |
| 7,449,437 B2 | 11/2008 | Gross et al. |
| 9,156,809 B2 | 10/2015 | Rieth et al. |
| 9,458,414 B2 | 10/2016 | Rieth et al. |
| 9,868,867 B1 | 1/2018 | Manley |
| 2004/0058832 A1* | 3/2004 | Shank ...................... C11D 3/43 510/201 |
| 2006/0089281 A1 | 4/2006 | Gibson |
| 2006/0258555 A1 | 11/2006 | Filippini et al. |
| 2007/0101902 A1 | 5/2007 | Frees et al. |
| 2008/0139437 A1* | 6/2008 | Power ................... C09D 9/005 510/208 |
| 2010/0104947 A1 | 4/2010 | Choi et al. |
| 2015/0014223 A1 | 1/2015 | Fan et al. |
| 2016/0040071 A1 | 2/2016 | Fan et al. |
| 2017/0042784 A1 | 2/2017 | Munk et al. |

FOREIGN PATENT DOCUMENTS

| | | |
|---|---|---|
| CH | 670 832 A5 | 7/1989 |
| DE | 195 26 351 A1 | 1/1997 |
| DE | 19526351 B4 | 6/2005 |
| WO | 03/062325 A2 | 7/2003 |
| WO | 2018/039415 A1 | 3/2018 |

OTHER PUBLICATIONS

International Search Report and Written Opinion of corresponding application PCT/US2018/054921, mailed Dec. 14, 2018, all enclosed pages cited.
International Preliminary Report on Patentability for International Application No. PCT/US2018/054921, dated Apr. 14, 2020 (all enclosed pages cited).
International Search Report and Written Opinion for International Application No. PCT/US2018/038159 dated Sep. 6, 2018 (all enclosed pages cited).
International Search Report and Written Opinion of International Application No. PCT/US2019/029368, mailed on Jun. 20, 2019 (all enclosed pages cited).

(Continued)

*Primary Examiner* — Gregory R Delcotto

(74) *Attorney, Agent, or Firm* — Shumaker, Loop & Kendrick, LLP

(57) ABSTRACT

A chemical composition and method of making and using are provided for paint removal and/or for adhesive removal. The chemical composition comprises THF and a solvent selected from the group consisting of methyl acetate, acetone, dimethyl carbonate, propylene carbonate, and 1-chloro-4 (trifluoromethyl) benzene, and a combination thereof.

19 Claims, No Drawings

(56) References Cited

OTHER PUBLICATIONS

Extended European Search Report, European Application No. 18865466.9, dated May 25, 2021, 6 pages.

* cited by examiner

AUTOMOTIVE PAINT REMOVER COMPOSITION AND METHOD OF MAKING

CROSS-REFERENCE TO RELATED APPLICATIONS

This application claims priority from provisional U.S. Patent Application Ser. No. 62/569,730 filed Oct. 9, 2017, in the United States Patent and Trademark Office. The disclosure of which is incorporated by reference in its entirety.

FIELD OF THE INVENTION

The present invention generally relates to paint removers.

BACKGROUND OF THE INVENTION

Most consumers use paint removers, also commonly referred to as paint strippers, for refinishing antique furniture, or woodworking's (doors, frames, moldings, etc.) in older houses. Many of these items have been painted, and repainted many times over the years. This results in items having multiple layers of paint containing different chemistry types and a different degree of difficulty from being removed. Paint removers are also used in the auto body repair industry to help with vehicle restoration.

Currently methylene chloride and N-Methylpyrrolidone (NMP) are used in the majority of paint removers in the United States. Methylene chloride has been the preferred solvent for use in paint removers for seventy years. Before methylene chloride was introduced, most paint removers consisted of a mixture of benzene and other volatile solvents such as methanol, acetone, and methyl ethyl ketone. Benzene was an ingredient in paint removers up until 1978 when it was withdrawn from consumer products in the US for causing severe health problems. Paint removers formulated with these volatile solvents are extremely flammable and the flammability of these paint removers resulted in fires causing injury and deaths. The benzene based removers were rapidly replaced with the methylene chloride paint removers because methylene chloride paint removers can be formulated to be non-flammable and are effective in removing multiple layers of paint. The physical characteristics give the methylene chloride molecule the ability to quickly penetrate multiple layers and to soften or dissolve chemically resistant coatings. Methylene chloride does not deplete the ozone layer and is considered to make negligible contributions to smog formation, the green-house effect and acid rain. Like other organic solvents, methylene chloride can be harmful to human health if used improperly.

However, regulations are changing to remove methylene chloride and NMP from the environment. For example, the US Environmental Protection Agency (EPA) is considering a range of possible voluntary and regulatory actions to address risks from the use of methylene chloride-containing paint and coating removal products.

According to the EPA, NMP is both produced and imported into the United States, with use estimated at over 184 million pounds per year. EPA estimates that approximately 9 percent of total NMP usage is for paint and coating removal products.

On Jan. 12, 2017, EPA issued a proposed rule under section 6 of the Toxic Substances Control Act with two proposed approaches for regulating NMP. According to the EPA, one approach is to prohibit the manufacture (including import), processing, and distribution in commerce of NMP for consumer and commercial paint and coating removal; to prohibit commercial use of NMP; and to require manufacturers, processors, and distributors, except for retailers, of NMP to provide downstream notification of these prohibitions throughout the supply chain; and to require limited recordkeeping. According to the EPA, the second approach is a combination of requirements to address unreasonable risks to workers and consumers including to limit the amount of NMP in paint removal products to no more than 35 percent by weight; require formulators to evaluate and identify specialized gloves that protect against skin absorption; require occupational users to have worker protection programs to require that workers wear personal protective equipment to prevent skin and inhalation exposures, require hazard communication for commercial users; and require warning labels for consumers with detailed information on proper ways to reduce exposure.

In view of the above, there is a need for an alternative paint remover that is effective, particularly for automotive and aircraft paints. A modern automotive paint system is made up of three layers, namely a primer coat, a base coat and a clear coat. The primer coat is designed to protect the surface, hide minor surface defects by forming a level coat and provides a uniform surface for the base coat to adhere. The base coat contains the pigments necessary to give the car the desired color and appearance. The clear coat is a glossy-transparent coating that protects automotive paint from the environmental conditions and UV light from the sun. Automotive paints are design for years of outdoor exposure and are more chemical resistant when compared to latex and alkyd paints used in the home. Commercial collision repair and automotive paint shops use paint removers to strip paint before repainting. To meet the requirement of commercial collision repair and automotive paint shops, the paint remover must be able to remove all layers of paint with one application in 30 minutes or less.

Thus, there is a need for an alternative automotive paint remover.

SUMMARY OF THE INVENTION

The present invention generally relates to a composition for use as a paint remover and method of making the composition.

In an embodiment of the invention, a chemical composition comprises tetrahydrofuran (THF) for use as a paint remover.

In an embodiment of the invention, the paint remover composition comprises a solvent selected from the group consisting of THF, methyl acetate, acetone, toluene, dioxalane, 1,2 trans dichloroethylene, and a combination thereof.

In an embodiment of the invention, a chemical composition comprises tetrahydrofuran (THF) for use as an adhesive remover.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DESCRIPTION OF THE PREFERRED EMBODIMENTS

The following description of the embodiments of the present invention is merely exemplary in nature and is in no way intended to limit the invention, its application, or uses.

The present invention has broad potential application and utility. The following description is provided herein solely by way of example for purposes of providing an enabling disclosure of the invention, but does not limit the scope or substance of the invention.

In an embodiment of the invention, a chemical composition comprising tetrahydrofuran (THF) is provided. Preferably, THF and at least one other solvent are used in combination. Non-limiting examples of a solvent include, but are not limited to, acetone, dimethyl carbonate, propylene carbonate, and 1-chloro-4 (trifluoromethyl) benzene, and a combination thereof. The chemical composition is suitable for chemically stripping and/or for removing a paint such as an automotive paint from a surface or paint from a surface of an aircraft. The chemical composition is also suitable for removal of an adhesive from a surface.

In a preferred embodiment, THF and one or both of methyl acetate and acetone are used in combination in the composition.

In an embodiment of the invention, a composition suitable for use as an automotive paint remover generally comprises tetrahydrofuran (THF) in a range of 10 weight percent to 50 weight percent, and an ester in a range of greater than 0 weight percent to 90 weight percent. Non-limiting examples of an ester include, but are not limited to, methyl acetate, ethyl acetate, butyl acetate, or a combination thereof. Methyl acetate is an example of a preferred ester. Weight percentages are based on the total weight of the composition.

In an embodiment of the invention, a composition suitable for use as an automotive paint remover generally comprises tetrahydrofuran (THF) in a range of 10 weight percent to 50 weight percent, and greater than 0 weight percent to 90 weight percent of a ketone. Non-limiting examples of ketones include, but are not limited to, acetone, dimethyl carbonate, propylene carbonate, or a combination thereof. Acetone is a preferred ketone.

In an embodiment of the invention, a composition suitable for use as an automotive paint remover comprises 10 weight percent to 50 weight percent of tetrahydrofuran (THF), 0 weight percent to 50 weight percent of an ester such as methyl acetate, ethyl acetate, or butyl acetate (with methyl acetate being a preferred ester), 0 weight percent to 90 weight percent of a ketone (with acetone being a preferred ketone), 0 weight percent to 2 weight percent of a thickener (preferably a cellulose ether thickener), 0.25 weight percent to 1 weight percent of a paraffin wax with a melting point range of 127 to 135° F., 0.25 weight percent to 5 weight percent of a nonionic or anionic surfactant, 0 weight percent to 5 weight percent of an amine such as aqua ammonia, monoethanolamine, diethanolamine, triethanolamine or diglycolamine as a chemical activator, with aqua ammonia being preferred.

The paraffin wax may serve as an evaporation retarder. The surfactant may serve to lower surface tension and for water washability of the paint remover.

Other additives may be present in the composition including, but not limited to, dye, fumed silica, Butylated hydroxytoluene (BHT), anti-peroxide forming agent, other thickeners, diglycolamine, ammonia, methanol, or combination thereof.

In an embodiment of the invention, the composition for use as an adhesive remover generally comprises tetrahydrofuran (THF) in a range of 10 weight percent to 20 weight percent. The composition further comprises a ketone in a range of 80 weight percent to 90 weight percent. Non-limiting examples of ketones include, but are not limited to, acetone, dimethyl carbonate, propylene carbonate, or a combination thereof. Acetone is a preferred ketone.

Other additives may be present in the composition including, but not limited to, dye, fumed silica, Butylated hydroxytoluene (BHT), anti-peroxide forming agent, other thickeners, diglycolamine, ammonia, methanol, or combination thereof.

The compositions of the present invention may be in a form of a liquid or an aerosol.

EXAMPLES

Experimental paint removers were tested on a hood from a 2004 Buick Le Saber purchased from a salvage yard in good condition with the factory paint intact. The hood was cleaned with a damp cloth and used in testing without further modifications.

A grid was marked on the hood with masking tape creating test cells approximately 1½ in.×1½ in. for the stripping trials. Each cell was labeled with the formula name and the duration time of the test. A series of formulas, listed in Table 1, using a combination of DMSO and one of the following solvents were tested on the hood: toluene, THF, 1,3 dioxolane and trans 1,2-dichloroethylene.

TABLE 1

Formulas based on a combination of DMSO and solvents toluene, THF, 1,3 dioxolane and trans 1,2 dichloroethylene.

| Formulation Component | A | B | C | D |
| --- | --- | --- | --- | --- |
| DMSO | 24.75 | 24.75 | 24.75 | 24.75 |
| toluene | 24.75 | | | |
| THF | | 24.75 | | |
| 1,3 dioxolane | | | 24.75 | |
| trans 1,2 dichloroethylene | | | | 24.75 |
| acetone | 42.95 | 42.95 | 42.95 | 42.95 |
| cellulose ether thickener | 1.25 | 1.25 | 1.25 | 1.25 |
| nonionic surfactant | 0.50 | 0.50 | 0.50 | 0.50 |
| paraffin wax | 0.80 | 0.80 | 0.80 | 0.80 |
| aqua ammonia 26 Baume | 5.00 | 5.00 | 5.00 | 5.00 |

Approximately 2 ml of the formula was applied to the hood and the performance was evaluated after 15, 30, and 60 minutes with number of layers of paint removed noted. After 60 minutes, formulas A, B, and D were only able to remove the clear coat.

To achieve better paint removing performance for automotive coatings, DMSO was removed from the formulation. Testing of the neat DMSO solvent on the automotive paint showed that DMSO failed to remove any of the paint after one hour.

A series of formulas based on THF or 1,3 dioxolane with acetone, methyl acetate and ammonia were formulated and are listed in Table 2.

TABLE 2

Series of formulas using THF or 1,3 dioxolane with acetone, methyl acetate and ammonia.

| Formulation Component | E | F | G | H | I |
| --- | --- | --- | --- | --- | --- |
| THF | 50 | | 50 | | 50 |
| 1,3 dioxolane | | 50 | | 50 | |
| Acetone | 50 | 50 | 45 | 45 | 22.5 |
| methyl acetate | | | | | 22.5 |
| aqua ammonia 26 Baume | | | 5 | 5 | 5 |

The formulas were tested on the hood to compare the performance of THF to 1,3 dioxolane in removing automotive paint using the following procedure. A sponge was cut to approximately sized 1½ in.×1½ in.×¼ in. pieces were placed on each test cell to control evaporation and retain the solvent to the test area. For each sample, approximately 2 ml of the formula was applied to the sponge and a timer is started. Additional solvent was added to the sponges as needed to ensure that the solvent remained in contact with the surface of the test panel. At 15, 30, and 60 minutes the test area was scraped using a plastic scraper and evaluated for the effects on the coatings and the number of layers of paint removed. Results of the testing are listed in Table 3.

TABLE 3

Testing results of solvent blends on automotive hood.

| Formula Number | 15 minutes | 30 minutes | 60 minutes |
| --- | --- | --- | --- |
| E | 0 | 1 | 1 |
| F | 0 | 1 | 1 |
| G | 0 | 1 | 3 |
| H | 0 | 1 | 3 |
| I | 0 | 1 | 3 |

0 - no effect on paint,
1 - clear coat removed,
2 - clear and color coats removed,
3 - clear, color and primer coat s removed.

As shown in Table 3, formulas G, H, and I, which contained ammonia, removed all layers of paint on the hood in 60 minutes. Formulas G and I, which were formulated with THF, was judged to have superior performance to Formula H which was formulated with 1,3 dioxolane. Based on the results of testing of the solvent mixtures in Table 3, paint remover formulas using THF, acetone, methyl acetate, and ammonia were formulated and are listed in Table 4.

TABLE 4

Paint remover formulas using THF, acetone, methyl acetate and ammonia.

| Formulation component | J (weight %) | K (weight %) | L (weight %) | M (weight %) |
| --- | --- | --- | --- | --- |
| THF | 49.5 | 49.5 | 49.5 | 44 |
| Acetone | 43.50 | 21.75 | — | 46.12 |
| methyl acetate | — | 21.75 | 43.50 | — |
| cellulose ether thickener | 1.25 | 1.25 | 1.25 | 0.1 |
| nonionic surfactant | 0.50 | 0.50 | 0.50 | 1 |
| paraffin wax | 0.25 | 0.25 | 0.25 | 0.25 |
| aqua ammonia 26 Baume | 5.00 | 5.00 | 5.00 | 5.00 |
| dye | — | — | — | 0.002 |
| BHT | — | — | — | 0.025 |
| Hydrophilic fumed silica | — | — | — | 3 |
| Diglycolamine | — | — | — | 0.5 |

As shown in Table 5, Formulas K and L containing methyl acetate removed all layers of paint in 30 minutes. Formula J containing acetone removed the clear coat and color coat in 30 in minutes and all layers of paint after 45 minutes.

TABLE 5

Testing results of paint removers formulated using THF and acetone, methyl acetate and ammonia on automotive hood.

| Formula Number | 15 minutes | 30 minutes | 45 minutes | 60 minutes |
| --- | --- | --- | --- | --- |
| J | 0 | 3 | 3 | 3 |
| K | 0 | 2 | 3 | 3 |
| L | 0 | 3 | 3 | 3 |

0 - no effect on paint,
1 - clear coat removed,
2 - clear and color coats removed,
3 - clear, color and primer coat s removed.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A automotive paint removing composition comprising:
    tetrahydrofuran (THF) that ranges from 33 wt % to 50 wt % of the total weight of the automotive paint removing composition,
    a solvent that is acetone ranging from 21.75 wt % to 90 wt % the total weight of the automotive paint removing composition, and
    an amine.
2. The automotive paint removing composition according to claim 1, wherein the solvent is acetone and ranges from 36 wt % to 54 wt % the total weight of the automotive paint removing composition.
3. The automotive paint removing composition according to claim 1, further comprising methyl acetate.
4. The automotive paint removing composition according to claim 1, further comprising an additive selected from the group consisting of a thickener, a paraffin wax, a surfactant, dye, fumed silica, Butylated hydroxytoluene (BHT), anti-peroxide forming agents, methanol, and a combination thereof.
5. The automotive paint removing composition according to claim 1, wherein the amine is selected from the group consisting of aqua ammonia, monoethanolamine, diethanolamine, triethanolamine, diglycolamine, and a combination thereof.
6. The automotive paint removing composition according to claim 1, wherein the composition is in a form of a liquid or an aerosol.
7. A method of removing automotive paint comprising applying the composition of claim 1 to a painted automotive surface for a predetermined time period thereby removing paint from the painted automotive surface.
8. A method of removing an adhesive comprising applying the composition of claim 1 to a surface and removing the adhesive and the composition from the surface.

9. A chemical composition consisting essentially of:
33 weight percent to 50 weight percent of tetrahydrofuran (THF),
a solvent that is acetone ranging from 21.75 wt % to 90 wt % the total weight of the chemical composition,
optionally an ester,
0 weight percent to 2 weight percent of a thickener,
0.25 weight percent to 1 weight percent of a paraffin wax,
0.25 weight percent to 5 weight percent of a surfactant, and
0.01 weight percent to 5 weight percent of an amine,
wherein weight percentages are based on the total weight of the composition.

10. The chemical composition according to claim 9, wherein the ester is selected from the group consisting of methyl acetate, ethyl acetate, butyl acetate, and a combination thereof.

11. The chemical composition according to claim 9, wherein the thickener is a cellulose ether thickener.

12. The chemical composition according to claim 9, wherein the amine is selected from the group consisting of an aqua ammonia, monoethanolamine, diethanolamine, triethanolamine, diglycolamine, and a combination thereof.

13. The chemical composition according to claim 9, wherein the chemical composition is in a form of a liquid or an aerosol.

14. A method of removing paint comprising applying the composition of claim 9 to a painted surface for a predetermined time period thereby removing paint from the painted surface.

15. A method of removing an adhesive comprising applying the composition of claim 9 to a surface and removing the adhesive and the composition from the surface.

16. The automotive paint removing composition of claim 1, wherein the amine is aqua ammonia present at up to 5 wt % of the total weight of the automotive paint removing composition.

17. The automotive paint removing composition of claim 2, wherein the amine is aqua ammonia present at up to 5 wt % of the total weight of the automotive paint removing composition.

18. The chemical composition of claim 9, wherein the amine is aqua ammonia present at 5 wt % of the total weight of the chemical composition.

19. The chemical composition of claim 9, wherein the solvent is acetone and ranges from 36 wt % to 54 wt % the total weight of the composition.

* * * * *